United States Patent Office 3,392,207
Patented July 9, 1968

3,392,207
PROCESS FOR MAKING OCTATRIENE AND POLYUNSATURATED POLYMERS
Roy L. Pruett, Charleston, W. Va., assignor to Union Carbide Corporation, a corporation of New York
No Drawing. Filed Mar. 16, 1964, Ser. No. 352,311
8 Claims. (Cl. 260—677)

ABSTRACT OF THE DISCLOSURE

Linear aliphatic unsaturated hydrocarbons are produced by intermixing butadiene-1,3 with a diaryl cobalt-containing catalyst which possesses a monovalent hydrocarbon substituent on the aryl ring in a position ortho to the aryl radical-cobalt bond, at a temperature where the butadiene-1,3 interreacts. The linear dimerized products of butadiene-1,3 are useful intermediate products which can be epoxidized or converted by the oxo process into alcohols.

---

This invention relates to the manufacture of octatriene isomers and to polyunsaturated polymers. The process of this invention is directed particularly to the manufacture of 5-methylheptatriene-1,3,6 and 1,3,6-octatriene. This invention is concerned with the dimerization and polymerization of butadiene-1,3 to octatriene compounds, such as described previously, and polymeric products possessing unsaturation in the skeletal chain. Such is accomplished by inter-reaction of butadiene-1,3 in the presence of a diaryl cobalt compound.

Heretofore, the dimerization of butadiene-1,3 has resulted primarily in the formation of cyclic olefinic compounds, such as vinylcyclohexene, cyclo-octadiene-1,5, 1,2-divinylcyclobutane, and the like with little, if any, formation of linear aliphatic dimerized product. Previous processes have been able to produce such linear products only in extremely small yields, that is, 5 weight percent or less, basis the weight of the butadiene-1,3 charged to the reaction. Linear dimerized products of butadiene-1,3 are potential useful chemicals, particularly if obtained in high yields and, consequently, at low enough prices for commercial exploitation, particularly of derivatives therefrom.

It is described herein a catalytic process by which butadiene-1,3 may be dimerized to form linear octatrienes in amounts which typically exceed 25 weight percent, basis the weight of butadiene-1,3 charged to the reaction. This is effected by intermixing butadiene-1,3 with a diaryl cobalt compound which possesses a monovalent hydrocarbon substituent on the aryl ring in a position ortho to the aryl radical cobalt bond.

Preferably, the cobalt compound contains two monovalent hydrocarbon substituents in the positions ortho to the aryl to cobalt bond. These substituents include, e.g., alkyl, aryl, aralkyl, alkaryl, aralkaryl, alkaralkyl radicals, and the like. The diaryl cobalt compounds are usually employed herein in the form of a complex with olefin and/or ether compounds.

The following formula characterizes usable diaryl cobalt compounds:

I 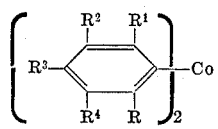

wherein R may be alkyl of from 1 to about 4 carbon atoms, aryl, alkaryl wherein the alkyl moieties thereof are of from 1 to about 4 carbon atoms, aralkyl wherein the alkyl moiety thereof has from 1 to about 4 carbon atoms, aralkaryl wherein the bridging alkylene moiety possesses from 1 to about 4 carbon atoms, alkaralkyl wherein the alkyl moieties thereof possess from 1 to about 4 carbon atoms, and the like; $R^1$, $R^2$, $R^3$, and $R^4$ may be hydrogen or R.

Ether compounds which form the operative etherates include cycloaliphatic ether and acyclic ethers possessing at least one ether oxygen having at least one methyl group bonded to it—particularly such defined ethers composed solely of carbon, hydrogen and oxygen. The acyclic ether may also possess two methyl groups bonded to the same oxygen as in the case of dimethyl ether. The ether compounds found particularly suitable are those which posses a molecular weight of from about 46 to about 200. Illustrative alicyclic ethers include the saturated cycloaliphatic ethers such as, e.g. tetrahydrofuran, tetrahydropyran, dioxane-1,4, dioxane-1,3 and the like ethers. Illustrative acyclic ethers which may be employed to form the etherates include, e.g., dimethyl ether, methylethyl ether, dimethyl ether of ethylene glycol, methylethyl ether of ethylene glycol, dimethyl ether of diethylene glycol, methylethyl ether of diethylene glycol, dimethyl ether of 1,3-propylene glycol, methylethyl ether of 1,3-propylene glycol, dimethyl ether of 1,2-propylene glycol, dimethyl ether of tetramethylene glycol, methylethyl ether of tetramethylene glycol, and the like compounds.

The diaryl cobalt compounds are produced by conventional Grignard synthesis, to wit, the aryl bromide is reacted with magnesium in the desired ether to produce the aryl magnesium bromide which in turn is reacted with cobalt chloride to produce the diaryl cobalt compound. The etherate may be formed in situ by employment of the desired ether as a solvent in the Grignard synthesis. The reaction is illustrated by the following equation:

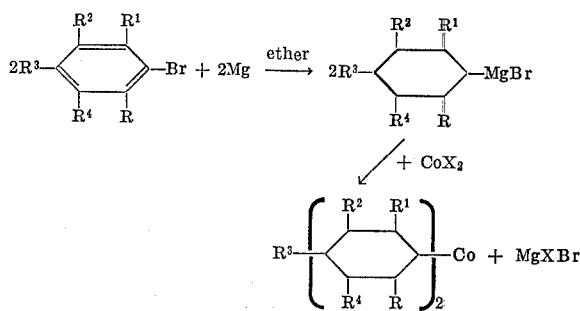

In the above equation X represents halogen, such as, chlorine, bromine, and/or iodine. It should be appreciated that aryl chlorides and iodides can be employed in the Grignard reaction.

In addition to the aforedefined etherate catalysts, there may be employed as a catalyst the complex formed association of the diaryl cobalt compound and butadiene-1,3. The diaryl cobalt etherate formed in the Grignard synthesis and containing magnesium halide from the synthesis may be mixed with butadiene-1,3 to effect transfer of diaryl cobalt from the etherate form to the butadiene-1,3 complex form. This latter complex may be equally utilized in the process of this invention to achieve production of the desired octatriene and/or the desired polymers. During the complex transfer, i.e. the exchange of butadiene-1,3 for ether, it is important to maintain the temperature below the decomposition temperature of the diaryl cobalt compound. The transfer may be effected at temperatures in the range of from about −30° C. or lower, to about 30° C. or higher. The transfer may be effected in the presence of a solvent which may be also employed to remove salts from the resulting butadiene complex. Useable solvents include benzene, tolylene, xylene, heptane, hexane, octane, dodecane, and the like. The resulting butadiene-diaryl cobalt complex may be utilized in the reaction by incorporating the complex with additional butadiene-1,3 and utilizing, if desired, higher temperatures to accelerate the degree of reaction.

The dimerization and polymerization of butadiene in the presence of the diaryl cobalt complex may be effected by simple intermixture of the complex with butadiene. Other ingredients, such as solvents, need not be employed though oftentimes their presence is favored. Useable solvents include all of the ethers described previously, as well as the hydrocarbon solvents described above in the separation of the butadiene-diaryl cobalt complex. In addition, butadiene-1,3 per se can be utilized as a solvent, particularly when the butadiene-diaryl cobalt complex is utilized as the catalyst in the dimerization or polymerization reaction.

The amount of cobalt complex employable in the reaction is variable and encompasses an extremely broad range. Operative conditions of temperature and pressure, the particular cobalt catalyst, the reaction size and design, and the like considerations will greatly determine the most desirable concentration to be utilized. However, it has been found particularly desirable to utilize amounts of cobalt complex, basis cobalt metal content, in a range of from about 0.0001 weight percent to about 20 weight percent, basis the weight of butadiene-1,3 employed in the reaction. Preferably, the concentration of the cobalt complex measured on a cobalt metal basis, is in a range of from about 0.001 to about 2 weight percent, basis weight of butadiene-1,3 utilized in the reaction. Particularly desirable results are obtained utilizing cobalt complex concentrations, on a cobalt metal basis, in the range of from about 0.1 to about 1 weight percent, basis weight of butadiene charged to the reaction.

The temperature of the reaction is usually significant, particularly for controlling the nature of the predominating product of the reaction. For example, if the reaction proceeds at a temperature below about 50° C. (e.g., to about 10° C.), the predominating reaction product is typically the aforedefined linear octatrienes. Utilizing a temperature in excess of 50° C., particularly in excess of 70° C., the predominating product is typically the acyclic ethylenically unsaturated polymer. The reaction temperatures may range from about −30° C., preferably from about 10° C. to the decomposition temperature of the cobalt catalyst. Preferably, the maximum temperature is about 100° C., most desirably, not in excess of 80° C. Illustrative of useable diaryl cobalt compounds are, e.g., the following: dimesityl cobalt, di(2,6-xylyl) cobalt, di(2 - methyl - 6-ethylphenyl)cobalt, bis(2,4-dimethyl - 6-isopropylphenyl)cobalt, mesityl-2,6-xylyl cobalt, mesityl-o-tolyl cobalt, 2,6 - xylyl-o-butylphenyl-cobalt, 2,6-xylyl-2,6-diphenylphenyl cobalt, bis(2-methyl-4-ethyl - 6 - phenylethylphenyl)cobalt, di-o-isopropylphenyl cobalt, and the like.

It is to be understood that the above list of cobalt compounds includes the correspounding etherates formed during, e.g., the Grignard synthesis. Thus, for example, dimesityl cobalt may be in the form of the tetrahydrofuran etherate because tetrahydrofuran is used as the solvent in the Grignard synthesis. The same holds true for the other cobalt compounds described previously. Any one of the aforedefined ethers may be utilized during formation of any of the specifically mentioned cobalt compounds.

The process of this invention may be effected at pressures ranging from about one atmosphere to 100 atmospheres or more. There is no narrowly critical pressure range to which this invention is limited. The length of time required to effect the reaction depends on the catalyst concentration, the temperature of the reaction, the particular catalyst employed, the particular solvents utilized in the reaction (if solvents are employed at all), and the like considerations.

It is to be understood that in the dimerization reaction a mixture of the aforedefined isomers, to wit, 5-methyl-heptatriene-1,3,6 and 1,3,6-octatriene, may be obtained. Each of the isomers may be separated from the other by conventional distillation procedures. The polymer, which is a much higher boiling compound than either one of the dimers, may be separated by distilling the linear octatrienes from the polymer thereby leaving the essentially purified polymer.

The reaction products of the process of this invention, to wit, the octatriene isomers and the butadiene polymer, are liquids at ambient conditions and may be employed in a plurality of areas. These products may be epoxidized with conventional epoxizing agents for use in conventional epoxide resin formations. In addition, the unsaturated compounds may be converted by the oxo process into alcohols which can be utilized in polyester formation or in forming simple esters, depending upon the number of hydroxyl groups incorporated into the molecule. Any of these unsaturated compounds may be fully polymerized in the presence of other ethylenically unsaturated monomers, e.g., vinyl chloride, to produce resinous coating compositions which are solid at ambient temperatures. The polymers, in view of their considerable unsaturation, are particularly desirable as drying oils. They may be also converted, by the oxo process, to mono- and polyaldehydes or ketones, and by the Cannizzaro reaction, the aldehydes can be converted to a carboxylic acid which can be used in the same manner as conventional fatty acids.

The following examples serve to illustrate the foregoing.

Example I

A 1-liter 4-neck flask is fitted with a mechanical stirrer, a thermometer, dropping funnel and reflux condenser with a nitrogen by-pass. In the flask are placed 400 milliliters of dry tetrahydrofuran (THF) and 12.15 grams (0.5 mole) of magnesium turnings. To this stirred mixture, at 35–40° C., is slowly added 99.5 grams (0.5 mole) of mesityl bromide. During the addition there is formed mesityl magnesium bromide.

In a second flask, fitted as above, are placed 29.5 grams (0.5 mole) of cobalt powder and 400 milliliters of THF. To this mixture is added, with stirring and cooling, 40.0 grams (0.25 mole) of bromine.

The solution of cobalt (II) bromide is cooled to −40° C. and the Grignard reagent is added to it. This gives a green slurry of dimesityl cobalt (II) tetrahydrofuranate. After stirring at −40° C. for 45 minutes, 70 milliliters of liquid butadiene is added and the resulting slurry is allowed to warm to room temperature (25° C.). At −10° C., the color changes to reddish-brown as the butadiene complex is formed. The catalyst may be used in this form or it may be further purified as follows:

The above solution is treated with 500 milliliters of benzene while under nitrogen and washed three times with deaerated water. The mixture is filtered once to remove a small amount of insoluble material. The washed benzene solution is dried over anhydrous potassium carbonate, then stripped of solvents at reduced pressure. The syrupy, red-brown residue weighs 111 grams.

Example II

A one-liter pressure vessel is charged with 150 milliliters of tetrahydrofuran, 0.1 mol of dimesityl cobalt (II) tetrahydrofuranate (THF) and 600 milliliters of butadiene-1,3. The vessel is sealed and heated, while rocking, at 40–45° C., for 8 hours.

The vessel is vented, opened, and the contents are flash distilled. The volatile fraction is redistilled at 0.5 atm. pressure to give 5-methylheptatriene-1,3,6, B.P. 95–96° C.

Example III

The procedure of Example II is followed, except that a reaction temperature of 80–90° C. is used. The reaction mixture is flash distilled to a pot temperature of 80° C.

at 1 mm. pressure to remove the volatiles. The viscous, red, residue is treated with dilute hydrochloric acid to remove the cobalt catalysts, then dried over anhydrous potassium sulfate, to yield a liquid butadiene polymer.

Example IV

A 1-liter pressure vessel is charged with 33 grams of the syrupy, red-brown residue obtained in Example I, 117 grams of THF and 420 grams of butadiene-1,3. The vessel is sealed and heated, with rocking, at 40–45° C. for 8 hours. The reaction is mildly exothermic for 2 hours.

The vessel is vented and the contents are stripped at 60° C. and reduced pressure (to 1 millimeter mercury). The volatile portion amounts to 419 grams, the higher polymeric residue weighs 119 grams. Fractionation of the volatile portions gives 220 grams of pure 5-methylheptatriene-1,3,6, boiling point 95–96° C. at 0.5 atmosphere.

Example V

A 1-liter pressure vessel is charged with 75 millimoles of the dimesityl cobalt catalyst residue employed in Example V, 125 milliliters of THF and 420 grams of liquid butadiene-1,3. The vessel is sealed and heated, with rocking, at 70° C. for 9 hours. Most of the pressure drop occurs during the first 2 hours.

After cooling to room temperature (about 25° C.) and venting, the vessel is opened and the liquid contents are due is dissolved in 500 milliliters of benzene and washed removed. The liquid production is flash distilled to a pot temperature of 90° C. at 1 millimeter mercury. This serves to remove solvent and any dimer fraction. The resi- three times with dilute hydrochloric acid. After a final water wash the benzene layer is dried and the solvent removed at reduced pressure. This gives 340 grams of liquid polymer. An infrared scan shows the product to be a polymer based on methylheptatriene units. Molecular weight determination proves it to be a low polymer having a molecular weight of less than 1,000.

Example VI

To a solution of 40 millimoles of unpurified butadiene catalyst complex of Example I is added 80 ml. (55 g.) butadiene and the reaction mixture is allowed to stand at room temperature and atmospheric pressure overnight. The mixture is then stripped of solvent and dimer fraction by flash distillation at reduced pressure.

The volatile fraction is distilled at atmospheric pressure until most of the THF is removed. Vapor phase chromatography shows the presence of THF and a large major $C_8$ fraction, which is shown to have the same retention time as 5-methylheptatriene-1,3,6.

Example VII

A solution of 30 millimoles of unpurified catalyst in THF, as described in Example I, while at atmospheric pressure, is kept saturated with butadiene-1,3 as the temperature is slowly raised to 50° C. After stirring at this temperature for 1 hour, the reaction mixture is flash distilled to a pot temperature of 50° C. at 1 millimeter (mercury) pressure.

The volatile portion is fractionated and the portion boiling at 93–96° C. at 0.5 atmosphere is collected. A combination of infrared analysis, nuclear magnetic resonance and maleic anhydride adduct positively identifies this fraction as 5-methyl-heptatriene-1,3,6.

Example VIII 5-methyl-1,3,6-heptatriene (63.6 grams, 0.59 mole) and peracetic acid (0.69 mole, 242 grams of a 21.7% soluiton in ethyl acetate) are mixed and stirred for 24 hours at 4° C. After sufficient peracetic acid has been consumed to account for the epoxidation of only one double bond, the reaction mixture is diluted with an equal volume of ethyl ether, washed with ice water, neutralized with sodium bicarbonate and dried over anhydrous magnesium sulfate. Careful distillation through a ¼" x 8" column packed with 1⁄32" stainless steel O-rings gives 12.3 grams (19.5%, 0.114 mole) of recovered 5-methyl-1,3,6-heptatriene and 29.1 grams (40%, 0.235 mole) of a mixture of 5-methyl-1,3,6-heptatriene monoxides boiling at 57° C. (31 mm. of Hg) ($n_D^{30}$=1.4367). Elemental analysis confirms the tentative identity: Calculated for $C_8H_{12}O$, percent: C=77.37, H=9.74. Found, percent: C=77.30, H=9.38. Infrared absorption studies establish that terminal methylene ($CH_2$=3.23$\mu$), carbon-carbon double bond, methyl terminal vinyl, trans epoxide and cis-epoxide groups are present in the mixture. Analytical vapor-phase chromatography demonstrate that two distinct isomers are present in nearly equal amounts. Ultraviolet absorption spectroscopy showed conclusively that conjugated unsaturation is not present in the mixed product. Analytical vapor-phase chromatography of the triene establishes that a single isomer is present. Infrared evidence suggests that the triene is the trans isomers. This permits conclusion that epoxidation of 5-methyl-1,3,6-heptatriene at low temperatures affords an essentially equimolar mixture of 1,2-epoxy-5-methyl-3,6-heptadiene and 3,4-epoxy-5-methyl-1,6-heptadiene. Nuclear magnetic resonance studies show agreement.

Though the above relates to specifics of the present invention, such is not intended to act to limit the invention unless provided in the claims.

What is claimed is:

1. A process for producing linear aliphatic unsaturated hydrocarbons selected from the group consisting of octatriene isomers and polyunsaturated polymers which comprises intermixing butadiene-1,3 with a catalytic amount of from about 0.001 to about 20 weight percent of a diaryl cobalt compound which possesses a monovalent hydrocarbon substituent on the aryl ring in a position ortho to the aryl radical-cobalt bond, and providing said mixture at a temperature of from −30° C. to the decomposition temperature of said diaryl cobalt compound at which said butadiene-1,3 interreacts.

2. The process of claim 1 wherein said diaryl cobalt compound possesses two of said monovalent hydrocarbon substituents.

3. The process of claim 1 wherein said diaryl cobalt compound is an etherate of an ether compound.

4. The process of claim 3 wherein said ether compound is selected from the class consisting of cycloaliphatic ether compounds and acyclic ether compounds which possess at least one ether oxygen having at least one methyl group bonded thereon.

5. The process of claim 1 wherein the diaryl cobalt compound is a complex with butadiene-1,3.

6. The process of claim 1 wherein the diaryl cobalt compound is provided in an amount of from about 0.0001 to about 20 weight percent of the butadiene-1,3 in said intermixture, based on the weight of cobalt in said compound.

7. The process of claim 1 maintained under essentially anhydrous conditions and in an essentially inert atmosphere.

8. The process of claim 7 wherein said diaryl cobalt compound is in the form of a complex.

References Cited

FOREIGN PATENTS 917,103   1/1963   Great Britain.

DELBERT E. GANTZ, *Primary Examiner.*

J. D. MYERS, *Assistant Examiner.*